United States Patent
Wayner

(10) Patent No.: US 7,072,635 B2
(45) Date of Patent: Jul. 4, 2006

(54) METHOD FOR COMBINING DATA FROM PHASE INDETERMINATE DATA STREAMS FOR RAKING

(75) Inventor: Paul M. Wayner, Centreville, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 443 days.

(21) Appl. No.: 10/680,491

(22) Filed: Oct. 8, 2003

(65) Prior Publication Data

US 2004/0067765 A1  Apr. 8, 2004

Related U.S. Application Data

(60) Provisional application No. 60/416,518, filed on Oct. 8, 2002.

(51) Int. Cl.
*H04B 1/10* (2006.01)
(52) U.S. Cl. .................. 455/304; 455/273; 455/275; 455/276.1; 375/142; 375/144; 375/364
(58) Field of Classification Search ............... 375/142, 375/144, 148, 150, 260, 343, 364; 455/296, 455/303, 304, 273, 275, 276.1; 370/350, 370/503
See application file for complete search history.

(56) References Cited

U.S. PATENT DOCUMENTS

| | | | |
|---|---|---|---|
| 6,333,934 B1 * | 12/2001 | Miura | 370/441 |
| 6,421,369 B1 * | 7/2002 | Iwaskai et al. | 375/130 |
| 6,795,488 B1 * | 9/2004 | Iwakiri | 375/148 |
| 2002/0018519 A1 * | 2/2002 | Chiba | 375/149 |
| 2003/0142726 A1 * | 7/2003 | Eltawil et al. | 375/146 |

* cited by examiner

*Primary Examiner*—Nguyen T. Vo
*Assistant Examiner*—Nhan T. Le

(57) ABSTRACT

A received wireless signal contains a plurality of path components, each having a phase indeterminate data stream derived from an original data stream. The receiver splits the received signal into N signal copies for N raking channels, which correlate each of the N signal copies with N locally generated signals, respectively, to generate N correlated signals. Each of the N correlated signals carries an estimated phase indeterminate data stream. The raking channels then synchronize each of the correlated signals to a system clock in phase and frequency to generate N synchronized signals. The N raking channels then align the N synchronized signals to generate N aligned signals, each of which carries an aligned path data stream that is normalized in time with respect to the other aligned signals. Finally the receiver combines the aligned signals to produce an estimated original data stream.

7 Claims, 9 Drawing Sheets

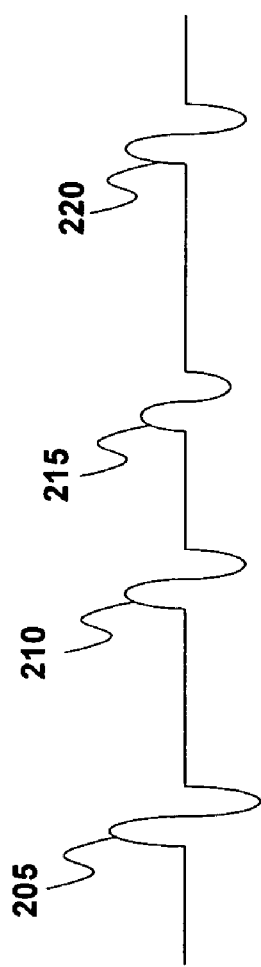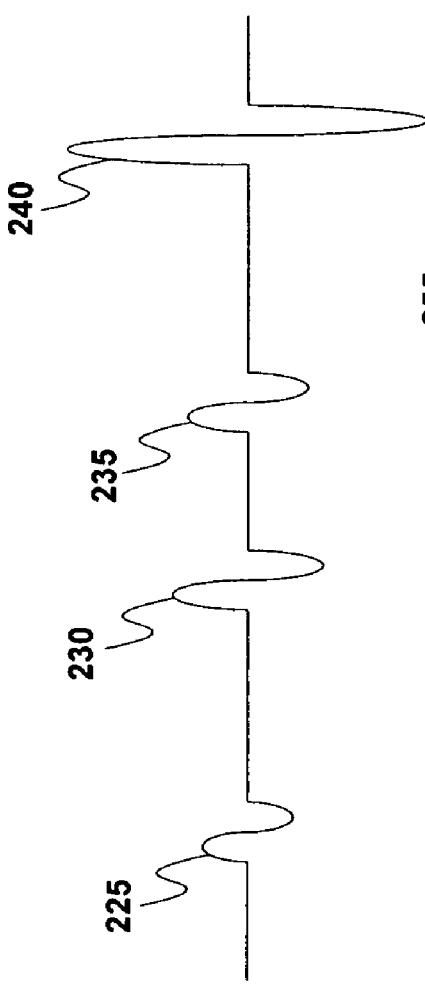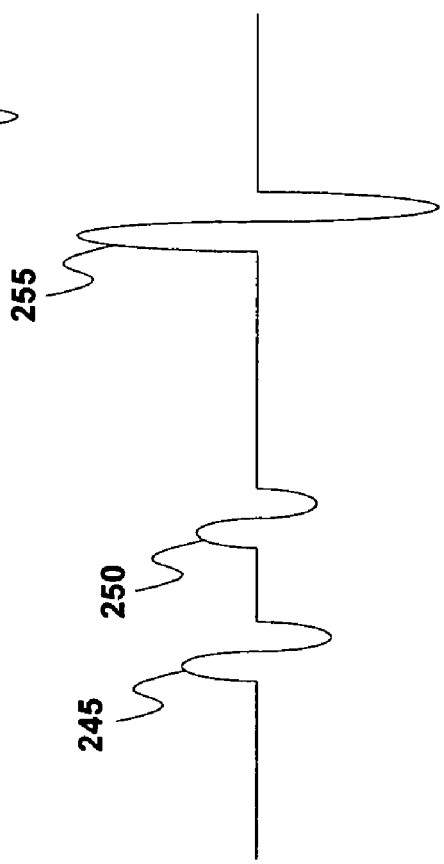

METHOD FOR COMBINING DATA FROM PHASE INDETERMINATE DATA STREAMS FOR RAKING

CROSS-REFERENCE TO RELATED PATENT DOCUMENTS

This application relies for priority on U.S. provisional application Ser. No. 60/416,518, by Paul W. Wayner, filed Oct. 8, 2002, entitled "METHOD FOR COMBINING DATA FROM PHASE INDETERMINATE DATA STREAMS FOR RAKING," the contents of which is hereby incorporated by reference in its entirety.

BACKGROUND OF THE INVENTION

Most radios operate in multipath environments. In such multipath environments, more than one transmission path exists between the transmitter and receiver. This is because the transmitted signal can be reflected off of various interfering surfaces as it travels to the receiver.

Narrowband radios suffer in multipath environments due to the frequency selective nature of the phenomena. Narrowband radios can employ rake receiver structures to combine signals from the multiple paths, but this is a difficult and expensive process since narrowband systems lack the time-domain resolution to easily resolve the multipath terms. Rake is a term used to describe the coherent combining of energy from a plurality of multi-path induced replicas of the desired signal.

By definition, however, ultrawide bandwidth (UWB) systems have high time-domain resolution, and thus can resolve multipath signals. High chipping rate UWB systems have the advantage of operating in quasi-stationary multipath environments where the multipath is changing much slower than the code duration.

Each of the multiple paths in a multiple path system, whether direct or reflected, may well have a different length and so will cause the signal to arrive at a different time. A raking receiver may be used when multiple paths exist between two radios. FIG. 1 is a block diagram of a wireless system having two radios in which there are multiple transmission paths between the two radios.

As shown in FIG. 1, the wireless system 100 includes first and second radios 110 and 120, having first and second antennas 115, 125, respectively. There is a direct line of sight path 140 between the two radios 110 and 120, but there are also indirect paths 152, 154, 156 caused by bouncing signals off of other objects 132, 134, 136 in the area around the two radios 110 and 120.

As a result, if the first radio 110 sends a pulse out of the first antennae 115, the second antennae 125 will receive a plurality of pulses having an arbitrary spacing that correspond to that signal as it passes along one direct path signal 140 and multiple different reflected paths 152, 154, 156. And although FIG. 1 shows only three reflected signals 152, 154, 156 bouncing off of three objects 132, 134, 136, there can be many more reflections off of multiple other objects. In rooms you can have hundreds, even thousands, of reflections with all kinds of different reflected path lengths. In addition, although each of the reflected signals are shown as bouncing once off of a single interfering object 132, 134, 136, paths that have multiple bounces are also possible.

Furthermore, depending on the properties of each object 132, 134, 136, the strongest signal received at the second antenna 125 may be a reflected signal 152, 154, 156 rather than the direct signal 140. One reason for this is that there could be something collecting energy at one of the objects 132, 134, 136 and focusing it towards the receiving antennae 125.

Another reason that a reflected signal may stronger than a direct signal is that there could be multiple objects that cause reflections having the same reflected path length. For example, if a first reflected path 152 has a length $L_1$, a second reflected path 154 has a length $L_2$, and $L_1=L_2$, the two path lengths will be exactly matched. As a result of this, one pulse will travel from the first antennae 115 along the first reflected path 152 to the second antenna 125, and another pulse will travel from the first antenna 115 along the second reflected path 154 to the second antenna. But since the path lengths are the same, both pulses will arrive at the second antenna 125 at the same time and they would add their strengths together. Therefore it is not necessary that the shortest path signal be the strongest one received at the receiver.

FIGS. 2A–2C are graphs showing examples of the strengths of received signals in a multipath environment. In particular, FIGS. 2A–2C show the strengths of signals received at the second antenna 125 when a single pulse is output from the first antenna 115 and travels only along the three paths 140, 152, 154, and 156 of FIG. 1.

As shown in FIG. 2A, four pulses 205, 210, 215, and 220 arrive when the paths 140, 152, 154, and 156 are of different length and the signal strengths are about the same size. FIG. 2B shows four pulses 225, 230, 235, and 240 coming in, where the paths 140, 152, 154, and 156 are of different length but the signal strength of one path is much larger that the other paths. As a result, one of the pulses 240 is larger than the other three. FIG. 2C shows only three pulses 245, 250, and 255 being received because the pulses from the two reflection paths (e.g., first and second reflected paths 152 and 154) have the same path length (i.e., $L_1=L_2$). As a result, the two reflected pulses add their strength and so the third pulse 255 in this instance is larger than the first or second pulses 245 and 255 (i.e., the pulses from the direct path 140 and the third reflected path 156).

Thus, each path, whether direct (140) or reflected (152, 154, 156), may well have a different length and so will cause the signal to arrive at a different time. The receiving portion of each device 110, 120 must be capable of accounting for these different path lengths.

SUMMARY OF THE INVENTION

Consistent with the title of this section, only a brief description of selected features of the present invention is now presented. A more complete description of the present invention is the subject of this entire document.

An object of the present invention is to combine data from phase indeterminate data streams without causing the data processing to be upset by over-sampling or lost data.

Another object of the present invention is to provide a method to align multiple received paths in phase and frequency without requiring an overly complex clocking structure for a receiver device.

These and other objects are accomplished by way of a method for combining data from phase indeterminate data paths. This method comprises: receiving a wireless signal at a receiving device, the wireless signal including a plurality of path components, each path component carrying a main phase indeterminate data stream derived from an original data stream; splitting the received wireless signal into N signal copies and providing those N signal copies to N raking channels; correlating each of the N signal copies with N locally-generated signals, respectively, to generate N correlated signals, each of the N correlated signals carrying a phase indeterminate path data stream that estimates one of the main phase indeterminate data streams from one of the plurality of path components; synchronizing each of the N correlated signals to a system clock phase and a system clock frequency in the receiving device to generate N synchronized signals, each of the N synchronized signals carrying a synchronized path data stream; aligning the N synchronized signals to generate N aligned signals, each of the N aligned signals carrying an aligned path data stream that is normalized in time with respect to the other (N−1) aligned signals; and combining the N aligned signals to produce an estimated original data stream.

The wireless signal in this method may be an ultrawide bandwidth signal.

Each of the N locally generated signals preferably has a different phase with respect to the other (N−1) locally generated signals.

The step of synchronizing each of the N correlated signals in phase and frequency with a system clock may comprises the following for each of the N correlated signals: performing an $i^{th}$ write process at an $i^{th}$ data phase and an $i^{th}$ data frequency to write sequential data values from the phase indeterminate path data stream in the $i^{th}$ correlated signal into a buffer; performing an $i^{th}$ read process at the system clock phase and the system clock frequency to read sequential data values out of the buffer to form the $i^{th}$ synchronized signal; determining for each cycle of the $i^{th}$ read process whether the $i^{th}$ read process is about to collide with the $i^{th}$ write process; and pausing the $i^{th}$ read process by one cycle if the determining step determines that the $i^{th}$ read step is about to collide with the $i^{th}$ write process, wherein i is an integer that varies from 1 to N, and wherein the read frequency is greater than the write frequency.

The method may further comprise pausing all of the first through $N^{th}$ read processes if any one of the first through $N^{th}$ read processes are paused for a cycle.

The step of aligning the N synchronized signals may comprise the following for each of the N correlated signals: extracting an $i^{th}$ synchronized data stream from an $i^{th}$ synchronized signal; extracting a control data stream from a control signal chosen from one of the N synchronized signals; sequentially shifting the $i^{th}$ synchronized data stream with respect to the control data stream by J to K cycles in order; determining (K−J+1) correlation values based on correlations between the control data stream and the shifted $i^{th}$ synchronized data streams for the J through K shift values; determining which one of the J through K shift values provides the greatest correlation value; and shifting the second signal by the one of the J through K shift values that provides the greatest correlation value shift to provide the $i^{th}$ aligned data stream, wherein J and K are integers. In one embodiment, J is −3 and K is 3.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which:

FIGS. 2A–2C are graphs showing examples of the strengths of received signals in a multipath environment;

DETAILED DESCRIPTION OF THE PREFERRED EMBODIMENTS

Figure 1:
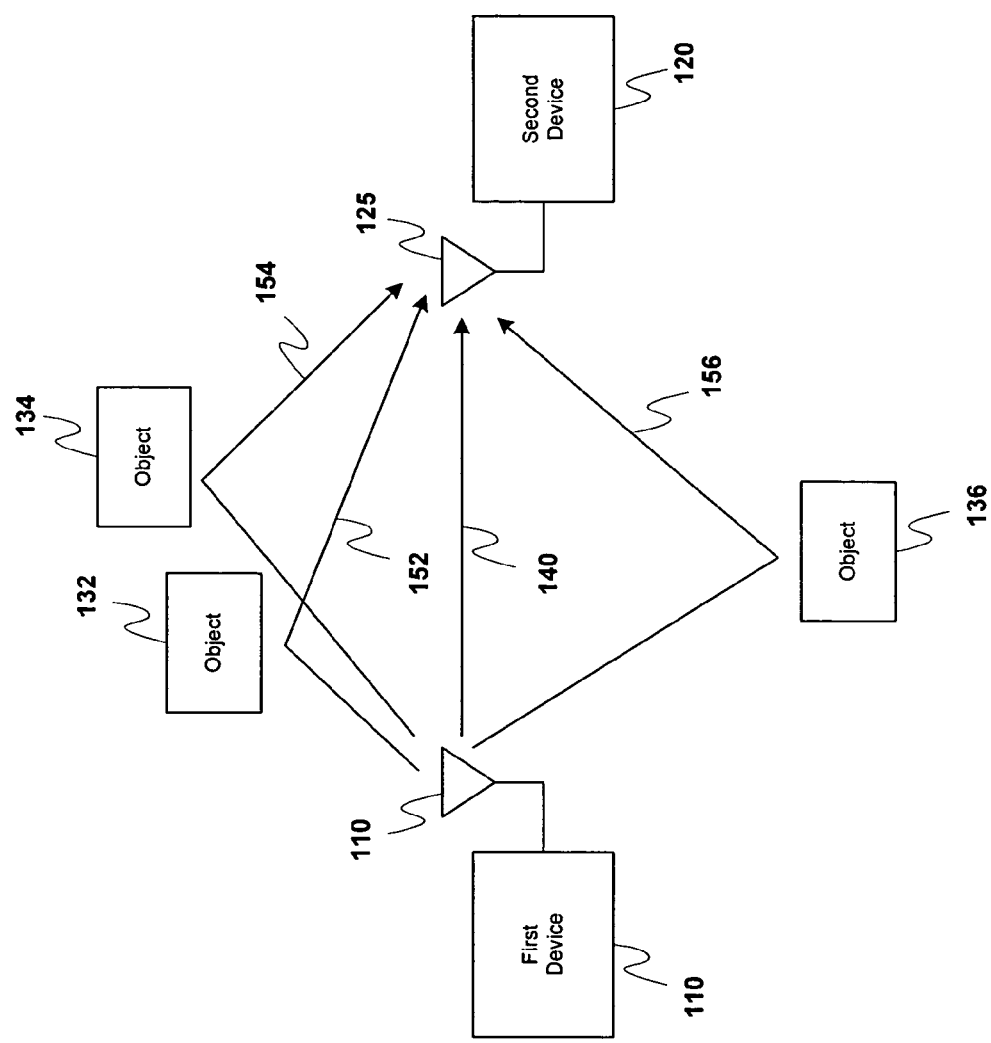
FIG. 1 is a block diagram of a wireless system having two radios in which there are multiple transmission paths between the two radios.

Preferred embodiments of the present invention will now be described with reference to the drawings. Throughout the several views, like reference numerals designate identical or corresponding parts.

In a preferred embodiment of a wireless local area network (WLAN) or a wireless personal area network (WPAN), the total transmission distance (even including reflections) will likely be less than 20 meters. In such an embodiment, the time difference between the direct path and various reflections will be on the order of 1 to 40 nanoseconds.

The idea behind raking can be described with respect to the system of FIG. 1. In this system, there is one transmitter (the first device 110) and one receiver (the second device 120). However, any transmission may travel along multiple paths 140, 152, 154, 156 to get from the transmitter 110 to the receiver 120. Thus, the receiver 120 may receive multiple copies of the same data signal arriving at different times (i.e., the received signals will be out of phase with each other). The receiver 120 will not know the phase of any given incoming signal, and if signal paths 140, 152, 154, 156 change (as they easily can should the devices 110, 120 or the interfering objects 132, 134, 136 move), those phases may change over time.

In a raking receiver according to preferred embodiments of the present invention, the receiving device 120 will look for the strongest signals at a certain number of phases to try and best determine what the actual received signal values are. The number of different incoming signal paths that the raking receiver will look at is referred to as the number of channels or arms or fingers that the raking receiver has.

For example, if the raking receiver looked for three best copies of the incoming signal, it would be referred to as a three-channel (or three-arm, or three-finger) raking receiver. More generally, an N-channel raking receiver can be used, where N is an integer greater than 1.

In alternate embodiments a raking receiver can correlate on a series of pulses rather than just one at a time. By using pulse codes to represent bits, these embodiments can reduce interference and provide both additional security and better network separation.

Figure 3:
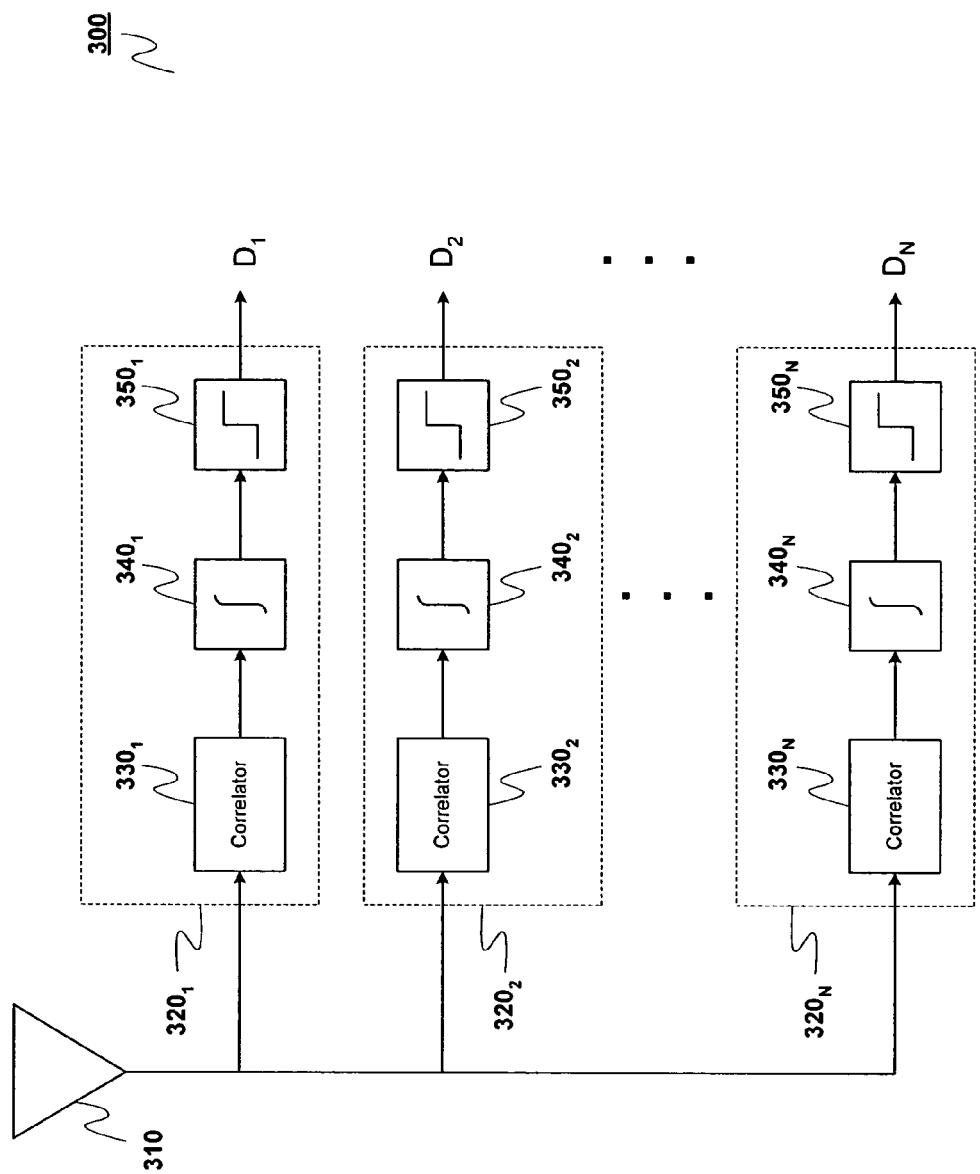
FIG. 3 is a block diagram of an N-channel raking receiver according to a preferred embodiment of the present invention.

FIG. 3 is a block diagram of an N-channel raking receiver according to a preferred embodiment of the present invention. As shown in FIG. 3, the N-channel raking receiver 300 includes a receiving antenna 310 and a plurality of channel receivers $320_1$–$320_N$. Each of the channel receivers $320_1$–$320_N$ includes a correlator $330_1$–$330_N$, an integrator $340_1$–$340_N$, and a filter $350_1$–$350_N$.

The correlators $330_1$–$330_N$ operate to mix a signal received from the receiving antenna 310 with a locally generated copy of that signal to find a correlation value. The correlators $330_1$–$330_N$ can vary the phase of the locally generated signal to find the maximum value for the correlation value.

The integrators $340_1$–$340_N$ preferably operate to integrate the correlation value over time. Most preferably the integrators $340_1$–$340_N$ are each sample-hold-dump (SHD) integrators having three separate integrators: one to sample the current correlation value, one to hold the most recent integrated correlation value for output, and one to dump the second most recent correlation value.

The filters $350_1$–$350_N$ can be used to modify the signals output from the integrators $340_1$–$340_N$, and can be eliminated in some alternate embodiments.

In operation, a signal comes into the receiving antenna 310, is split and sent to each of the channel receivers $320_1$–$320_N$, where it passes through a correlator $330_1$–$330_N$, an integrator $340_1$–$340_N$, and a filter $350_1$–$350_N$, to produce a data value signal $D_1$–$D_N$.

Preferably the criteria used to determine the quality of the incoming signal paths will be how well a known bit or bit pattern correlates with a locally generated copy of that bit or bit pattern. This is accomplished in each channel by mixing a locally generated signal with the incoming signal, determining a correlation result based on the result of that mixing, and varying the phase of the locally-generated bit or bit pattern until a maximum correlation value is achieved. An N-channel raking receiver will thus look for the N different phases that produce the N largest correlation values. These will correspond to the N strongest received signal paths.

In an N-channel raking receiver, the receiving device will have to control the phases of the locally generates signals to keep the receiver locked onto the incoming signal paths. In other words, it must control the phase of each channel to maintain a maximum correlation peak.

Each signal passing from the first (transmitting) device 110 to the second (receiving) device 120 starts out at the same time (i.e., at the same phase), since there is only one transmitter. However, once they are transmitted, each copy of the signal will become delayed. The delays that each received signal suffers include external delays and internal delays.

External delays come from the varying lengths of the different signal paths 140, 152, 154, 156 that the data signals take. The longer the signal path 140, 152, 154, 156, the greater the delay. Internal delays occur because of phase delays that are imposed on the locally generated signals. Internally the digital signal processing (DSP) logic in the receiver is sending signals back to control the delays. Most of the delay experienced by a signal, however is in path delay.

The receiver will determine the delay (i.e., the phase difference) of the received signal copies by manipulating an internal clock, i.e., by changing the phase relationships with the clock.

Raking Receiver

Figure 4:
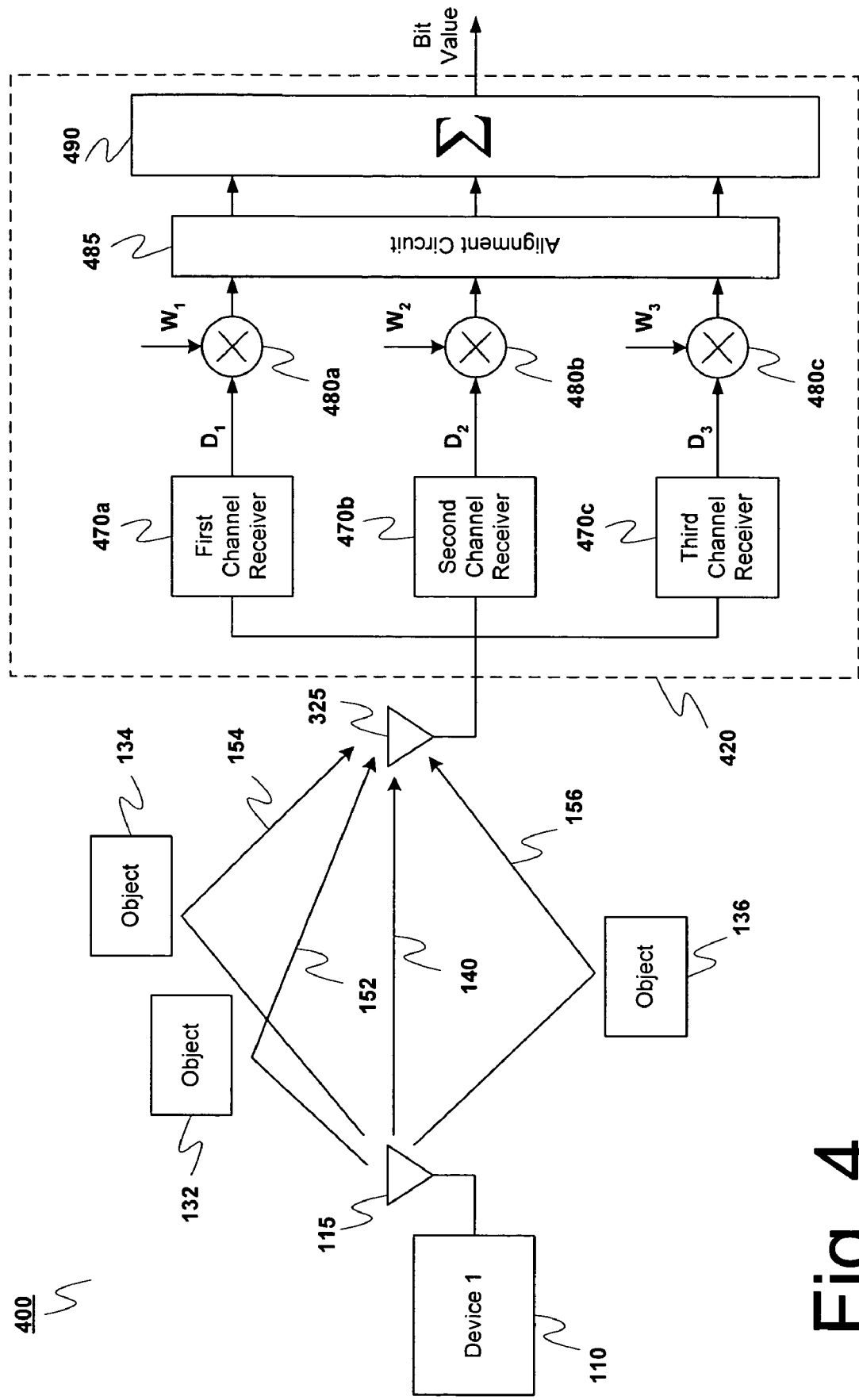
FIG. 4 is a block diagram of a wireless system using a three-channel raking receiver, according to a preferred embodiment of the present invention.

FIG. 4 is a block diagram of a wireless system using a three-channel raking receiver, according to a preferred embodiment of the present invention. As shown in FIG. 4, the system 400 includes a transmitting device 110 having a first antenna 115 and a receiving device 420 having a receiving antenna 425. The receiving device 420 includes first, second, and third raking receivers 470a–470c, first through third weighting mixers 480a–480c, an alignment circuit 485, and a summer 490.

The receiving device 420 receives a signal from the first device 110 along multiple signal paths 140, 152, 154, 156 and uses a three channel rake process for processing the signal transmitted from the first device 110. The first, second, and third channel receivers 470a–470c, each receive their signals from the receiving antennae 425, but process the received signal differently. As noted above, each of the channel receivers 470a–470c can be called a channel, a finger, or an arm.

In this preferred embodiment the receiving antennae 425 is attached to the first, second, and third channel receivers 470a–470c in the raking receiver 420, each of which channel receiver is tuned to a specific pulse (e.g., pulses 220, 225, and 230 from FIG. 2B).

The first, second and third channel receivers 470a–470c output first, second, and third data signals $D_1$, $D_2$, or $D_3$, respectively, which are by this stage have been synchronized to a single clock by the first, second and third channel receivers 470a–470c. The first, second, and third data signals $D_1$, $D_2$, or $D_3$, are then weighted by first, second, and third weight values $W_1$, $W_2$, or $W_3$, respectively through the first through third weighting mixers 480a–480c. The weighted output signals are then aligned with each other by the alignment circuit 485, and then added together by the summer 490, which outputs a final bit value.

In alternate embodiments the alignment circuit 485 could be placed before the first through third weighting mixers 480a–480c.

The first, second, and third weights $W_1$, $W_2$, and $W_3$ used in the receiving device 420 of FIG. 4 are used to account for the variance of the received pulses. If a large pulse is correlated at one raking receiver, that large signal will receive a greater weight than a smaller received pulse. This higher weight indicates that the signal received at that particular radio receiver is more likely to be the correct signal.

The channel receiver with the highest weight will indicate the value of the received pulse with a very low error. The other channel receivers provide bit values that have greater errors, and so have smaller weights. But if the system combines the three weighted signals, the combined result would actually more accurate than just the output of any one of the channel receivers by itself (even the channel receiver with the lowest error).

In order to achieve this increased accuracy, the outputs of the first through third channel receivers 470a–470c are preferably weighted in inverse proportion to their variance. In other words, an output of higher variance would be weighted less, while an output of lower variance would be weighted more.

Because the summer 490 adds values output from the first through third weighting mixers 480a–480c (after they are aligned by the alignment circuit 485), the final result has information from all three raking channels. And because each of the first through third data signals $D_1$–$D_3$ are weighted by the first through third weighting signals $W_1$–$W_3$, respectively, the more accurate arms contribute more to the resulting bit value output from the summer 490. This can provide up to a 3 dB gain, which is significant.

In a preferred embodiment, the normalized sum of the weighting signals $W_1$–$W_3$ will always add up to 1.

Consider the following example in which the receiving device 420 of FIG. 4 receives the four delayed pulses 225, 230, 235, and 240 of FIG. 2B. In this example, the first channel receiver 470a locks onto the second pulse 230, the second channel receiver 470b locks onto the fourth pulse 240, and the third channel receiver 470c locks onto the third pulse 235. The first pulse is not locked onto because it is the smallest of all four of the pulses and the receiving device 420 only has three raking channels.

The first channel receiver 470a produces a first data value $D_1$, the second channel receiver 470b produces a second data value $D_2$, and the third channel receiver 470c produces a third data value $D_3$.

Because the second channel receiver 470b processes the largest pulse (i.e., the fourth pulse 240), the second data value $D_2$ will be weighted the highest. Similarly, because the first channel receiver 470a processes the second largest pulse (i.e., the second pulse 230), the first data value $D_1$ will be weighted the second highest. Finally, because the third channel receiver 470b processes the smallest of the processed pulses (i.e., the third pulse 235), the third data value $D_3$ will be weighted the lowest. Thus, $W_2 > W_1 > W_3$.

Although the preferred embodiment of FIG. 4 discloses three raking receivers 470a–470c, alternate embodiments could expand this to N raking receivers, where N is an integer greater than one. In this case each of the N receiver outputs will be weighted by a respective first through $N^{th}$ weight value $W_1$–$W_N$.

In addition, although FIG. 4 discloses a transmitting device 110 and a receiving device 420, these devices can one or both be transceivers, each operating in turn as a transmitting device and a receiving device. However, for the sake of simplicity, FIG. 4 discloses one as a transmitter and one as a receiver.

Raking Operation

In operation the receiver 420 will have multiple signals coming in over multiple paths 140, 152, 154, 156, each of which will be phase indeterminate operating off its own analog clock. In a standard receiver design the barrier between analog and digital processing has implications for timing. Once signal processing is converted from analog-to-digital it converts from the analog part of the chip to the digital part of the chip, and alters how the receiver 420 must handle clocking for the processing of that signal.

But since the analog clock signals for each of the multiple signals received at the receiver 420 are phase indeterminate, it is necessary that any received signals that are processed must, at some point, be synchronized to the same clock so that they can be aligned and summed.

In one embodiment, it is possible to use one of the analog clocks associated with an incoming data signal as the master clock and have all the other data signals synchronized to that clock. However doing this presents several problems. One problem is that the circuitry to effectively implement this embodiment would be complex. This is because for power consumption reasons, not all of the channels will necessarily be active all the time. As a result, the receiver would have to be able to use any of the incoming analog clocks as the master clock, and so would have to be able to switch between the different channels as those different channels become active and inactive. Since the master clock (whatever is used) must clock most of the digital section, this embodiment would require a very robust clock switching circuit. And switching between two different asynchronous clocks without creating glitches is difficult. This problem can become particularly severe when attempting to switch between N different possible clocks.

A second problem has to do with the reliability of the clock. In the proposed analog master clock implementation, the analog clocks must be manipulated in phase by the correlator. Therefore, the resulting clock may have a varying duty cycle and frequency. This can produce an unreliable clock, which complicates synthesis efforts. All synthesis timing must thus be able to handle all of the possible frequencies and duty cycles that the analog clock may present, and this is a significant restriction.

Normally, when using static timing in digital circuits, timing engines look from rising edge to rising edge, and consider the delay between the two. For example, a circuit with a 100 MHz clock would have 10 nanoseconds from rising edge to rising edge.

But, if the circuit manipulates its clock, then it might be operating at less than its top speed (e.g., less than 100 MHz in the above example). In that case, it would be necessary to design the entire circuit with the worst case in mind. In addition, most software engines that are used for simulating and synthesizing digital circuits do not work very well with variable clock frequencies in digital logic designs. They are designed to work well with consistent clock sources in which the clock has a set frequency and duty cycle, without the possibility that it will alter at any point.

Also when the final data is output to other digital chips, the data will still be synchronous to the unreliable analog clock. This will normally necessitate another resynchronization at a later point.

Therefore, it is often desirable to have an external clock whose frequency doesn't change, and then to sample incoming data streams. The problem with this is that, with phase indeterminate systems, it is important to make certain that the sampling will be performed correctly.

One solution is to sample faster than the data source, such that there is no possibility of missing a sample. Unfortunately, a high sampling rate requires a high clock speed, which increases power consumption. To conserve power, it is therefore desirable to sample as slowly as possible, but to still not miss a sample.

Thus, if data (i.e., the first through third data values $D_1$–$D_3$) arrives at a data frequency $F_D$, it is desirable to sample at a sampling frequency $F_S$ that is just a little bit greater than the data frequency (i.e., $F_S = F_D + \Delta F$). Thus, if the receiver 420 samples at the sampling frequency $F_S$, it will never miss a data point, but will reduce its power consumption as much as possible. In general terms, it is desirable to have a sampling clock operate at a sampling frequency $F_S$ that is always higher than the maximum frequency $F_{D-MAX}$ that the data stream can have, even under a worst-case scenario (i.e., $F_S = F_{D-MAX} + \Delta F$). In one preferred embodiment ($F_{D-MAX} = 100$ MHz), ($\Delta F = 1$ MHz), and ($F_S = 101$ MHz).

This raises the problem, however, that the receiver 420 is sampling faster than it needs to (even if only by a small amount). Therefore, it is necessary to make certain that it only samples data when it is valid, and doesn't unintentionally over-sample it. This is a problem because the receiver might grab the same data source twice and the DSP algorithms are not designed to handle this. For example, it might sample the very first nanosecond of a piece of data and then sample again the very last nanosecond of that same piece of data. In this case the receiver must determine what to do with that extra data value Over-sampling can occur because the sampling frequency $F_S$ is higher than the worst case, i.e., highest, data frequency $F_{D\text{-}MAX}$ of the incoming data. It becomes a more common occurrence if the data frequency $F_D$ of the incoming data is lower than the maximum data frequency $F_{D\text{-}MAX}$.

Figure 5:
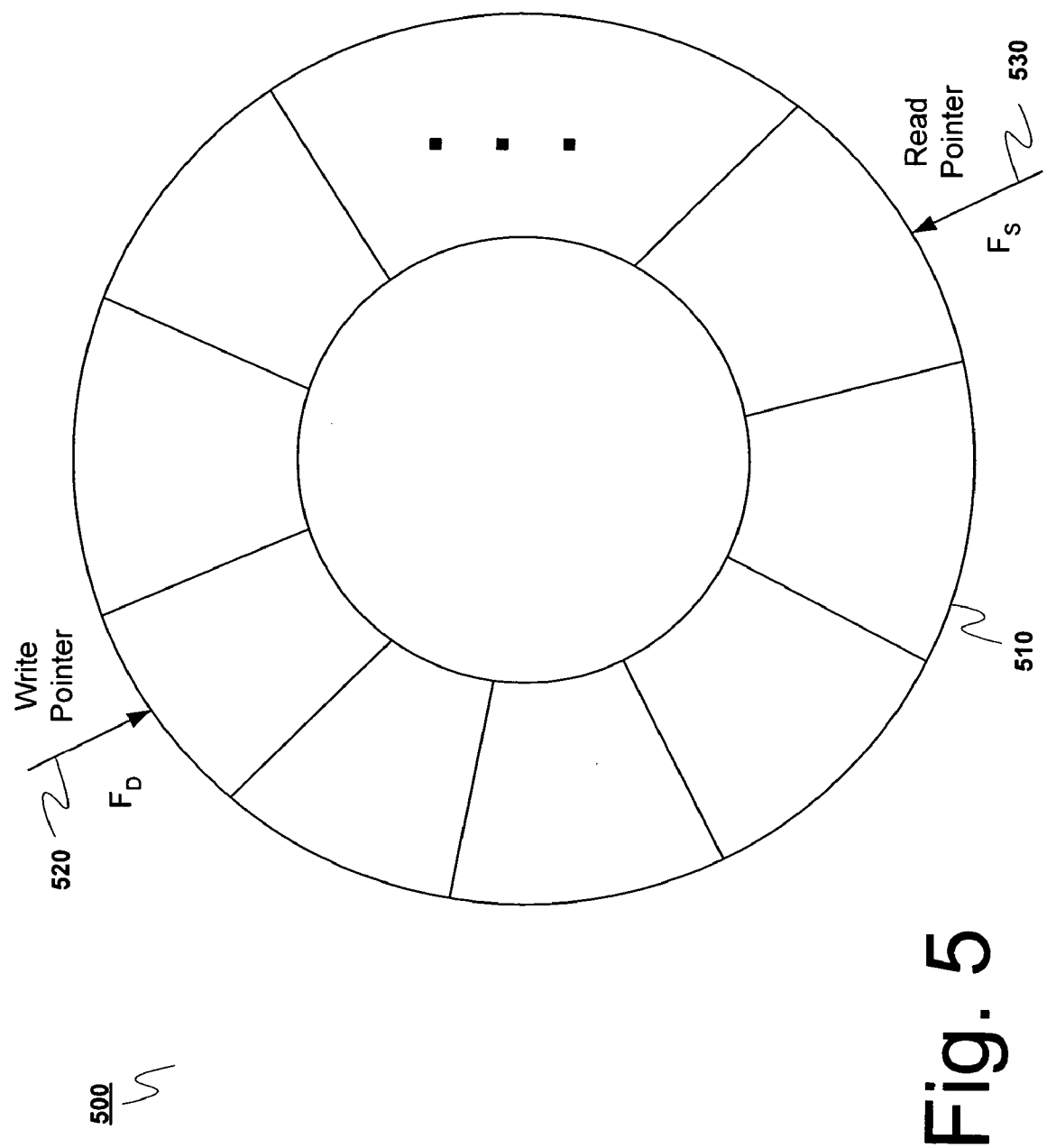
FIG. 5 is a block diagram of a FIFO buffer according to a preferred embodiment of the present invention.

One preferred way to avoid unintentional over-sampling is to use a circular first-in-first-out (FIFO) register to track the incoming data. FIG. 5 is a block diagram of a FIFO buffer according to a preferred embodiment of the present invention. As shown in FIG. 5, the circular FIFO buffer 500 includes a plurality of register slots 510, a write pointer 520, and a read pointer 530.

The write pointer 520 preferably operates off of a clock that is synchronous with the data string, i.e., it operates at a frequency of $F_D$. The read pointer 530 preferably operates off of an internal sampling clock, i.e., it operates at a frequency of $F_S$.

Whenever the circular FIFO buffer 500 receives a new data value, the circular FIFO buffer 500 puts it into one of the plurality of register slots 510, cycling through the plurality of register slots 510 in turn. The incoming data values are preferably written sequentially through the slots 510 in the circular FIFO buffer 500, overwriting the oldest slot 510 with the newest data value. The circular FIFO buffer 500 keeps track of the next register slot 510 that a data value should be written to by through the use of the write pointer 530, which advances to the next register slot 510 every time the data clock cycles (i.e., it advances at the data frequency $F_D$).

Similarly, whenever the sampling clock cycles, the receiver will sample the incoming data values by reading out the data value stored in one of the plurality of register slots 510, cycling through the plurality of register slots 510 in turn. The circular FIFO buffer 500 keeps track of the next register slot 510 that data should be read from through the use of the read pointer 530, which advances every time the sampling clock cycles (i.e., it advances at the data frequency $F_S$).

Of course this means that the read pointer 530 will always be reading data values faster than the write pointer 520 is writing data values, and so eventually the read pointer 530 will catch up with the write pointer 520.

When this happens, the FIFO control logic will stop the read pointer 530 for one cycle and neither read a data value nor advance the read pointer 530 to the next register slot 510 for that cycle. That lets the write pointer 520 get a little bit ahead and avoids having the receiver read the same data value twice.

In one preferred embodiment the receiver grey code encodes the write pointer value, and sends it to the sample clock domain. A controller in the sample clock domain will then examine the write pointer value to determine if the read pointer 530 is getting too close to the write pointer 520, and prompt it to skip a cycle when necessary.

A grey code is arranged such that every two adjacent entries in the code have a hamming distance of one (i.e., only one bit is different). For example, if a first entry had a binary value of 001 and a second entry had a value of 011, then the hamming distance would be one since only one bit s changed between the two values. Using this form of encoding it is possible to pass a multi-bit number between two asynchronous circuits without producing a glitch since only one bit at a time can change.

Of course, when the read pointer 530 skips a cycle, the receiver is aware of this and can accommodate accordingly. In other words, the receiver knows that it has no valid data for that cycle (i.e., no new valid data), and can have its digital signal processing ignore this cycle (i.e., do nothing). In this way the receiver can skip the entire sampling cycle and avoid unintentional over-sampling.

A circular FIFO buffer structure is particularly advantageous in this situation since each register 510 will have a delay between when they are written to and when they are read. This delay will preferably provide the registers with any asynchronous settling time that they require.

Although the circular FIFO buffer 500 discloses the use of registers 510, alternate embodiments could use different means of storing data such as random access memories (RAMs) or latches Using a Circular FIFO Buffer for Raking A circular FIFO buffer 500 as shown in FIG. 5 can also be used in a raking process. Consider a receiving device that has an N-channel rake receiver, each channel having a circular FIFO buffer 500. This receiving device can thus receive and process N different sources of data (i.e., N different phases of the signal incoming at a receiving antenna). Normally, because of jitter effects, the signals being processed in each of the channels will be out of phase with each other. As a result, each of the channels will perform its series of read, write, and occasional skipped read cycles independently of each other. In other words, there will be no predictability as to when each channel will skip a read cycle and have no valid data value output.

This could cause problems when one (or more) of the N raking channels enters a skip cycle. In this case, one (or more) of the N data streams output from the N raking channels will have no valid data, while the others will still be outputting valid data values. This can cause significant problems with the weighting and summing process, which is predicated on the fact that all of the data values are valid. If some of the data values are invalid, then the weighted sum of the values will also be invalid.

In one preferred embodiment this problem can be avoided by having all of the raking channels skip a cycle when one of them does. Thus, if one of the raking channels determines that it should not read a data value, it will send a control signal to all of the other raking channels instructing them to skip that cycle too. In this way all of the raking channels will stall at the same time, on the same cycle. The receiving device can then handle this easily because no data is valid, and so it can all be ignored.

This will cause some of the raking channels to skip a cycle a little bit earlier than they needed to, because they will all skip a cycle when the read pointer in the earliest raking channel data catches up with its corresponding write pointer. But there is still no danger of the write pointer in any of the raking channels colliding with a prematurely delayed read pointer because in every raking channel the read pointer is reading data values faster the corresponding data values are being written.

Preferably the raking channels begin sending data through the FIFOs before the data is needed. As a result the read pointer in any given raking channel will generally be well ahead of its corresponding write pointer before the receiver ever needs to actually read any data. If a particular channel is producing a bad clock (i.e., a clock at a significantly different frequency than the others) it will produce excessive skipping of data cycles. This can be detected by the FIFO control logic and preferably would result in the FIFO control logic eventually disabling that channel and continuing operation with the remaining channels.

Aligning Multiple Data Sources

After data has been synchronized to a single clock, it is still necessary to align the data before it can be summed. This is because while the signals processed by the different raking channels are identical in content, they may be shifted in time with respect to one another. Since the time-resolution of a UWB system is so high, the different path lengths that the different copies of the signals can pass through from the transmitter to the receiver can cause the copies to get out of phase with each other sufficiently that pulses (representing bits or portions of bit codes) can be misaligned (e.g., an $n^{th}$ bit in first channel might be processed at the same time as an $(n-1)^{th}$ bit in a second channel, and with an $(n+2)^{th}$ bit in a third channel.) The exact amount of possible misalignment would depend upon the pulse width and the longest possible path length.

Figure 9:
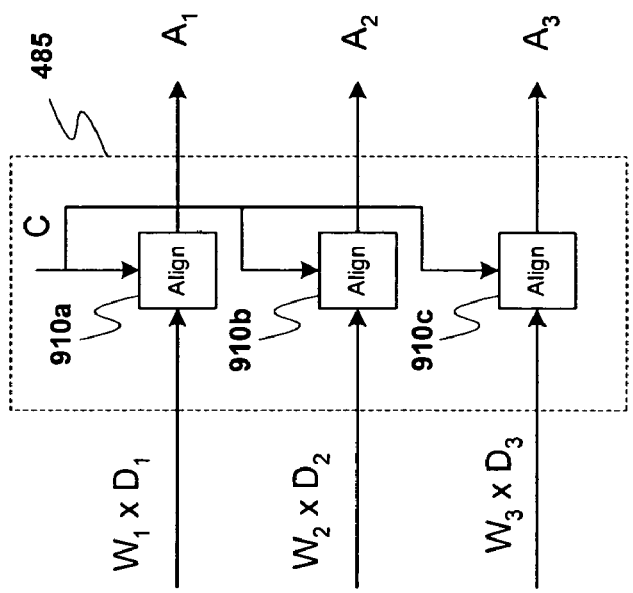
FIG. 9 is a block diagram of the alignment circuit of FIG. 4 according to a preferred embodiment of the present invention.

For the offset data from each of the channels to be properly summed, they must first all be aligned in time. This can also be referred to as normalizing the channels in time. This is accomplished in the embodiment of FIG. 4 by the alignment circuit 485. FIG. 9 is a block diagram of the alignment circuit of FIG. 4 according to a preferred embodiment of the present invention.

As shown in FIG. 9, the alignment circuit 485 may include first, second, and third alignment elements 910a, 910b, and 910c. Each of these alignment elements 910a, 910b, and 910c receives a weighted data value ($D_i \times W_i$) and a master signal that the weighted data value will be aligned with. The master signal is preferably one of the weighted data values, most preferably the weighted data value that is the strongest at the receiver (and therefore the most reliable).

As noted above, in alternate embodiments, the alignment circuit 485 could be placed before the first through third weighting mixers 480a–480c. In this case, the alignment elements 910a–910c receive respective unweighted data values $D_1$–$D_3$, and one of these data values $D_1$–$D_3$ would be chosen as the master signal.

The alignement elements 910a–910c operate to align each of the input signals with the master signal. One way to do this is to use a variable delay FIFO buffer.

Figure 10:
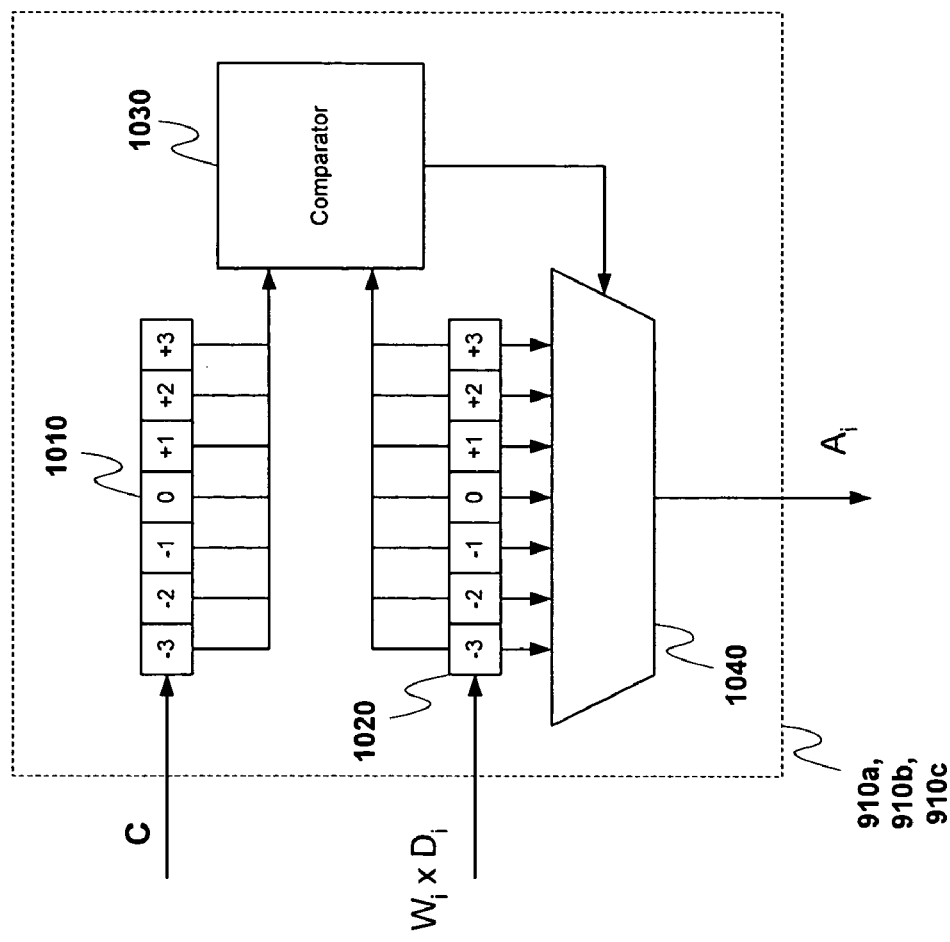
FIG. 10 is a block diagram of an alignement element from FIG. 9 according to a preferred embodiment of the present invention.

FIG. 10 is a FIG. 10 is a block diagram of an alignement element from FIG. 9 according to a preferred embodiment of the present invention As shown in FIG. 10, the alignment element 910a, 910b, 910c includes a first FIFO buffer 1010, a second FIFO buffer 1020, a comparator 1030, and a multiplexer 1040.

As noted above, to align two data channels one channel is chosen as the master and is set at a delay/advance of +0. The master channel is provided to the first FIFO buffer 1010. The second channel (i.e., from the $i^{th}$ channel provided to the $i^{th}$ alignment element) runs through the second FIFO buffer 1020. The depth of the FIFOs can be altered depending upon the time resolution of the system and the distance between the transmitter and receiver.

Every clock cycle (of the synchronized clock) the comparator 1030 compares the elements of the input channel to the elements of the master channel at multiple cycle offsets, −3, −2, −1, 0, +1, +2, +3. In other words, it compares the two signals at sequential pulses (with each pulse indicating one cycle offset) measured from a base pulse (e.g., the "0" offset). At each cycle offset, comparator 1030 compares the two channels and looks for a correlation. This is done over multiple cycles looking for a good correlation result.

Once a high correlation is found at a particular offset (e.g., after K cycles), that offset is determined to be a good offset for the channel, and all data from that channel is delayed or advanced by that offset value. If a high correlation is not found then the collected values are preferably dumped and the process starts again until a good value is found.

Once a good correlation value is found, the multiplexer 1040 will be instructed to output that particular offset as the current signal. In other words, the output from the current channel will be some number of pulses (i.e., cycle offsets) either ahead or behind that of the master channel.

For example, if the correlation between the master and second channel were best at +1, then the second channel would be tapped off by the multiplexer 1040 at the +1 point. This corresponds to 1 cycle later in time than the master channel, which is always tapped at 0.

In this manner the plurality of channels can have their data streams normalized in time. Once normalized, each of the data streams will proceed in lock step (i.e., each producing a $1^{st}$ bit at the same time, a $2^{nd}$ bit at the same time, etc.).

For systems with N channels one of the N channels is preferably chosen as the master, most preferably the one with the strongest signal. The other (N−1) channels are each individually compared to the master channel to determine their individual offsets. On cycles where no valid data in input, the alignment circuit simply halts for a cycle and outputs no valid data.

Accommodating Sleeping Channels

Some embodiments may allow raking channels to be occasionally shut down in order to conserve power. This may occur, for example, when the receiver has a very strong signal and doesn't need to use all of its raking channels to get a valid signal. In such a case, the receiver may choose to shut down one or more raking channels for a time until the signal strength drops to a point where they are needed.

In operation, the controller that oversees the rake receivers will instruct the relevant elements in the receiver to ignore any the sleeping raking channel. Furthermore, the controller will give any sleeping raking channel a weight of zero so that it will no longer contribute to the value output from the summer. And because each raking channel has an independent clock, it is relatively easy to shut a given channel down when it is desirable to do so.

In embodiments using CMOS circuitry, however, it may be preferable that the power to a channel not actually be shut down, but rather that the clock to that circuitry be shut off clock. Because the leakage current in CMOS devices is extremely low, when they are not clocking they move little moving charge around, and so consume very little power. Then, when the receiver is ready to start the raking channel again, it can simply allow the clock to the raking channel circuitry to go active again.

In this circumstance, the fact that you have one clock, the sample clock, is an advantage for such processes. If there were multiple clocks, then the system would have to have multiple circuits for disabling the different clocks and a means to coordinate these activities across multiple clock domains.

However, at some point the receiving device may wish to turn the sleeping raking channels back on, either to perform raking or to perform other functions (e.g., a raking channel could also be used to scan for interfering sources or different networks).

One area of concern when turning raking channels back on is the location of the read and write pointers in those channels. In particular, it is important to make certain that the read and write pointers in the newly woken raking channel do not immediately collide on restart. This could occur, for example, if upon restart the read and write pointers in a raking channel were right next to each other, and then during the next clock cycle another raking channel issued a shutdown on the read pointer, causing the write pointer in the newly woken raking channel to advance while the read pointer does, causing the two to collide.

To avoid this problem, the system preferably resets the circular FIFO buffer 500 for the newly woken raking channel to a rest position in which the read and write pointers are significantly separated. As a result, there is no possibility of the write pointer accidentally colliding with the read pointer right away. And since the read pointer in a given raking channel moves faster than the write pointer (i.e., it operates at a higher frequency), the read pointer will outpace the write pointer and there will be no chance of a later collision.

It is also preferable to allow the newly restarted raking channel run for a number of cycles equal to the depth of the FIFO buffers 1010 and 1020 in the alignment elements 910a, 910b, 910c before the receiver begins using the data values from that channel. The time period required fir this insignificant as compared to the time period that the raking channel will be in operation.

In an alternate embodiment, a controller could examine the read and write pointers of one of the active FIFOs, simply copy their values, let the system run for a short time, and it should function properly.

Multiple Channel Raking Receiver

Figure 6:
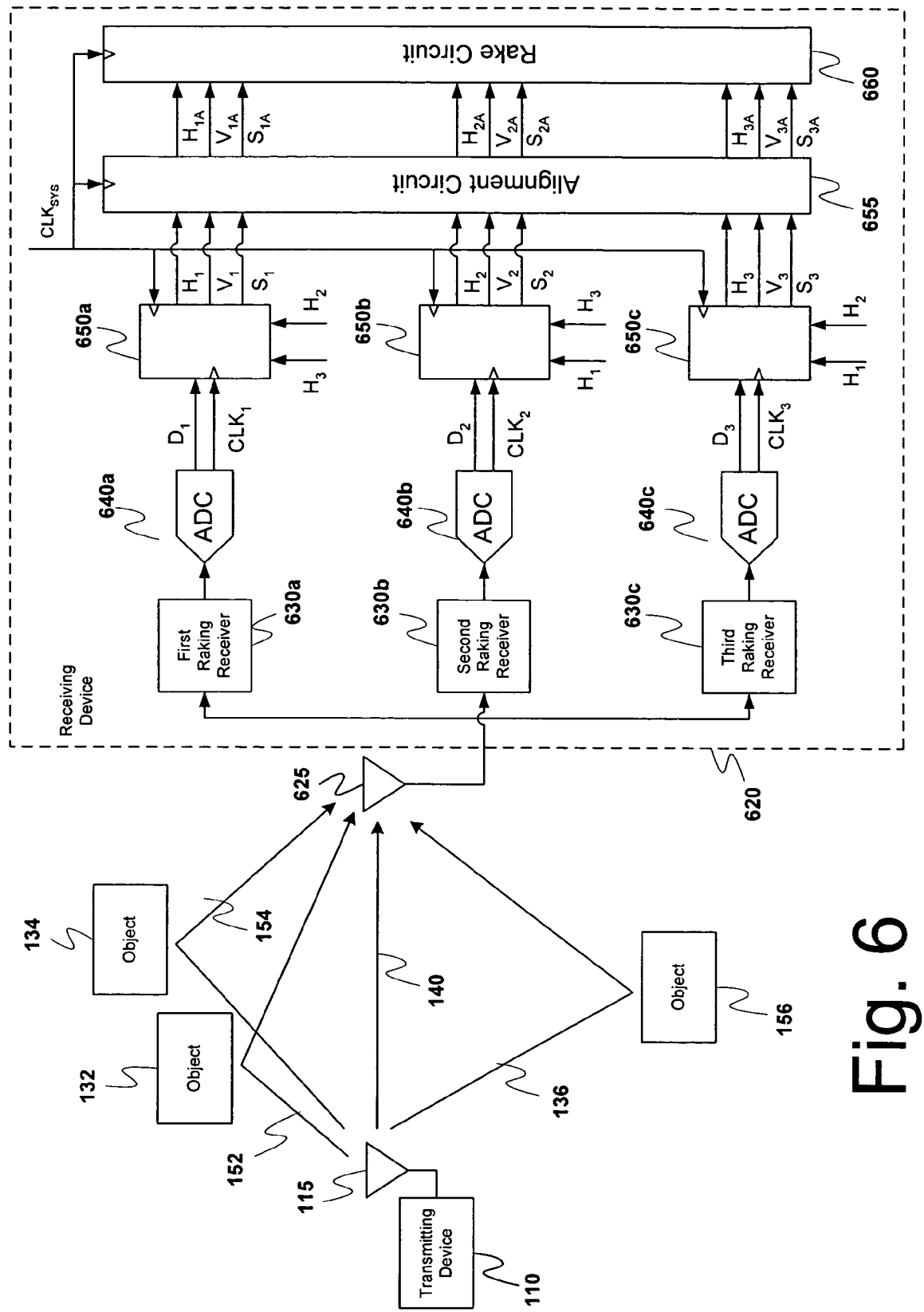
FIG. 6 is a block diagram of a wireless system using a three-channel raking receiver according to a preferred embodiment of the present invention.

FIG. 6 is a block diagram of a wireless system using a three-channel raking receiver according to a preferred embodiment of the present invention. As shown in FIG. 6, the wireless system 600 includes a transmitting device 110 having a transmitting antenna 115 and a receiving device 620 having a receiving antenna 625. The receiving device 620 includes first through third receiving radios 630a–630c, first through third analog-to-digital converters (ADCs) 640a–640c, first through third circuits 650a–650c, and rake logic 660.

A transmitting device 110 begins by transmitting a bounded signal at an unknown phase and frequency. The transmission of this signal can follow multiple signal paths from the transmitting device 110 to the receiving device 620, including a direct path 140 and multiple reflected paths 152, 154, 156. These multiple copies of the transmitted signal will arrive at the receiving device 620, each at the same frequency that they were transmitted at, but each with a phase that has further shifted based on the distance of its particular path 140, 152, 154, 156.

The receiving antenna 625 receives a signal, splits it, and passes it to the first, second, and third raking receivers 630a, 630b, and 630c, where they are correlated, integrated, and filtered as needed to correlate data signals from three different incoming paths (e.g., as shown in FIG. 3). The first, second, and third raking receivers 630a, 630b, and 630c, produce analog data values, each of which is indicative of the correlated value of their respective incoming data path. Preferably, these will represent the data values obtained from the strongest data paths of the multiple data paths.

The first through third ADCs 640a–640c then receive the analog data values from the first through third receiving radios 630a–630c, respectively, and convert the analog signals into digital data $D_1$–$D_3$. The first through third ADCs 640a–640c then output the respective digital data $D_1$–$D_3$, along with an associated clock $CLK_1$–$CLK_3$ that is synchronous with the data $D_1$–$D_3$. to the first through third circular FIFO buffers 650a–650c, respectively.

The digital signal processing (DSP) area of the receiving device 620 (also called the digital baseband) uses a system clock $CLK_{SYS}$ that is independent of any of the first through third clocks $CLK_1$–$CLK_3$ associated with the digital data $D_1$–$D_3$. The frequency of this system clock should be chosen to be greater than the highest frequency expected on any of the first through third clocks $CLK_1$–$CLK_3$ (including any error they might have due to clock jitter, temperature and humidity or components, etc.).

The first through third FIFO circuits 650a–650c operate to convert the first through third digital data values $D_1$–$D_3$ signals from being timed according to the first through third data clock signals $CLK_1$–$CLK_3$, respectively, into synchronized data signals $S_1$–$S_3$ that are uniformly synchronized with the system clock $CLK_{SYS}$. And the first through third FIFO circuits 650a–650c do this in a manner that avoids the danger of over-sampling.

The first through third FIFO circuits 650a–650c also produce first through third halting signals $H_1$–$H_3$ that indicate when the FIFO circuit read function should be halted for one cycle of the system clock CLKSYS, and first through third data valid signals $V_1$–$V_3$ that indicate when the synchronized data signals $S_1$–$S_3$ are valid and when they are not.

The outputs of the FIFO buffers 650a–650c feed into the alignment circuit 655, which align the channels and produced aligned versions of the halting signals $H_{1A}$–$H_{3A}$, aligned versions of the data $S_{1A}$–$S_{3A}$, and aligned versions of the valid signal $V_{1A}$–$V_{3A}$. In one embodiment, the alignment circuit can be implemented as shown in FIGS. 9 and 10.

The rake logic 660 receives the aligned data $S_{1A}$–$S_{3A}$ and valid data signals $V_{1A}$–$V_{3A}$ and uses these to provide bit values for the incoming signal. The synchronized data $S_{1A}$–$S_{3A}$ was preferably weighted, and is summed as needed. The valid data signals $V_{1A}$–$V_{3A}$ indicate when the rake logic should ignore the aligned data $S_{1A}$–$S_{3A}$ as invalid.

In addition, although FIG. 6 discloses a transmitting device 110 and a receiving device 620, these devices can one or both be transceivers, each operating in turn as a transmitting device and a receiving device. However, for the sake of simplicity, FIG. 6 discloses one as a transmitter and one as a receiver.

Figure 7:
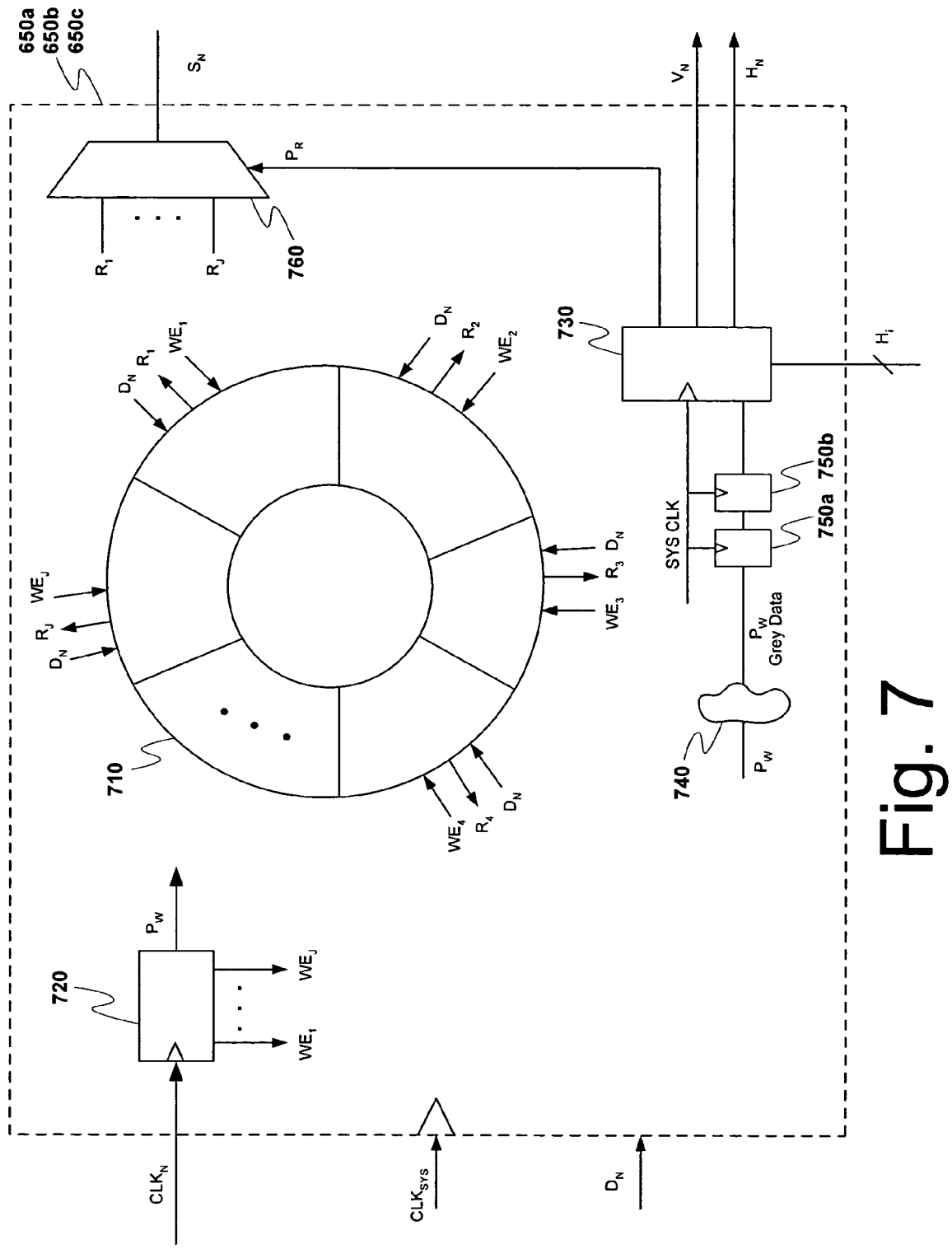
FIG. 7 is a block diagram of a FIFO circuit of FIG. 6 according to a preferred embodiment of the present invention.

FIG. 7 is a block diagram of a FIFO circuit of FIG. 6 according to a preferred embodiment of the present invention. As shown in FIG. 7, the FIFO circuit 650a, 650b, 650c includes a circular FIFO buffer 710, a write enable circuit 720, a read enable circuit 730, a grey encoder circuit 740, first and second buffers 750a and 750b, and a multiplexer 760.

The FIFO circuit 650a, 650b, 650c receives an incoming data clock $CLK_N$ and an associated data value $D_N$. The data value $D_N$ is written into the circular FIFO buffer 710 (which has J registers, where J is preferably 4–8). Although we only show the data input connecting at three points, in actuality, the data is connected to all of the different memory locations inside the circular FIFO. The circular FIFO buffer 710 can be different sizes.

The write control circuit 720 controls where the incoming data value $D_N$ will be written into in the circular FIFO buffer 710 by maintaining a write pointer $P_W$ that points to a location inside the circular FIFO buffer 710. At every cycle of the data clock $CLK_N$, the write pointer $P_W$ it will advance through the circular FIFO buffer 710, eventually circling around and overwriting the oldest entries.

In a preferred embodiment the write control circuit 720 generates a write enable signals $WE_1$–$WE_J$, one for each entry in the circular FIFO buffer 710. The write control circuit 720 enables only one write enable signal $WE_1$–$WE_J$ for any given write operation, based on the position of the write pointer $P_W$. In alternate embodiments the actual write pointer could be eliminated and replaced with a write control machine, making the write pointer an inferred concept.

The read control circuit 730 controls which register value $R_1$–$R_J$ will be read out of the circular FIFO buffer 710 to be provided by the FIFO circuit 650a, 650b, 650c as the synchronized data signal $S_N$ by maintaining a read pointer $P_R$ that points to a location inside the circular FIFO buffer 710. At every cycle of the system clock $CLK_{SYS}$, the read pointer $P_R$ it will advance through the circular FIFO buffer 710, eventually catching up with the write pointer $P_W$ and standing idle for a cycle.

The grey encoder circuit 740 takes the write pointer $P_W$ as an input and outputs a grey encoded write pointer. The first and second buffers 750a and 750b are clocked by the system clock $CLK_{SYS}$ and serve to synchronize the grey encoded write pointer with the system clock $CLK_{SYS}$.

Since the read control circuit 730 operates off the system clock $CLK_{SYS}$, while the write control circuit 720 operates off of the data clock $CLK_N$, absent some action, the read pointer $P_R$ will eventually catch up with the write pointer $P_W$. For the reasons noted above, such a collision should be avoided. Therefore, read control circuit 730 uses the synchronized grey encoded write pointer provided from the second buffer 750b to determine when the read pointer $P_R$ is about to collide with the write pointer $P_W$.

The multiplexer 760 receives the register values $R_1$–$R_N$ as inputs and the read pointer $P_R$ as a control signal. It outputs one of the input register values $R_1$–$R_N$ as the synchronized data signal $S_N$, based on the value of the read pointer $P_R$.

When the read pointer $P_R$ and write pointer $P_W$ get too close (as indicated to the read control circuit by a comparison of the synchronized grey encoded write pointer and the read pointer $P_R$), the read control circuit 730 will stop the read operation for one cycle of the system clock $CLK_{SYS}$. And when the read operation stops, the read control circuit 730 sets the data valid line $V_N$ appropriately to indicate that the data is invalid for that one cycle, and sets the halt signal $H_N$ appropriately to indicate that the other FIFO circuits should also halt operation for that system clock cycle.

The read control circuit 730 also receives the halt signals $H_i$ from all of the other FIFO circuits in the receiving device 620. When any of those halt signals $H_i$ indicates a system halt, the read control circuit 730 halts operation for one cycle of the system clock $CLK_{SYS}$ and sets the data valid line $V_N$ appropriately to indicate that its data is invalid for that one cycle.

Thus, when one FIFO circuit 650a, 650b, 650c halts operation for a cycle, all of them do. As a result, the rake logic 660 can easily account for this and perform its normal summing operation without having to do anything special. Furthermore, it can do so without taking into account the fact that all of the FIFO circuits 650a, 650b, 650c are operating somewhat independently of each other (i.e., at slightly different clock speeds).

In determining that the read pointer $P_R$ and write pointer $P_W$ are too close, the read control circuit 730 can act when they are either about to collide, or are within a certain number of register slots of each other, depending upon the implementation.

Data Synchronization Method

Figure 8:
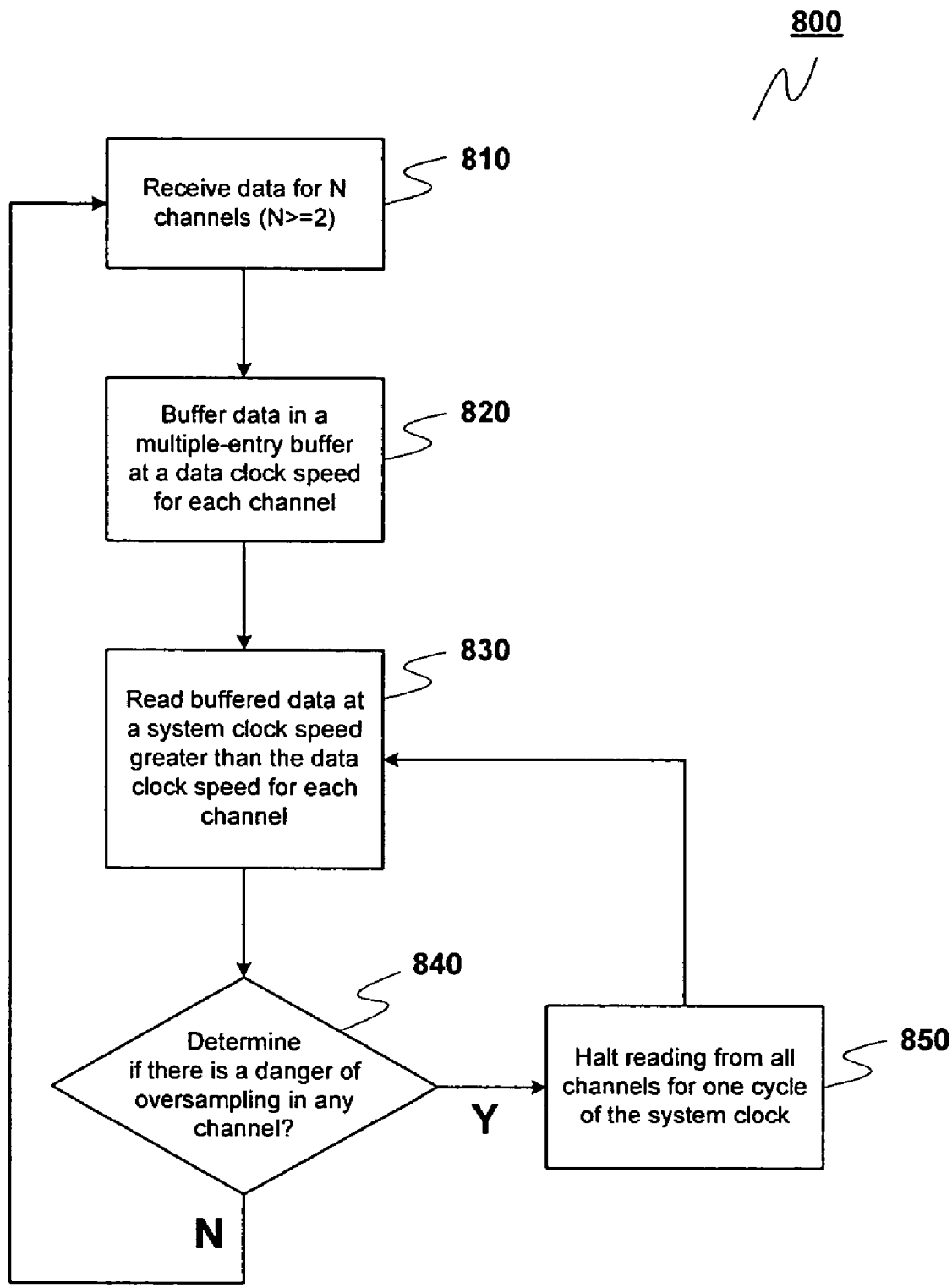
FIG. 8 is a flow chart showing a method of synchronizing data according to a preferred embodiment of the present invention.

FIG. 8 is a flow chart showing a method of synchronizing data according to a preferred embodiment of the present invention. As shown in FIG. 8, the method 800 begins when a receiving device initially receives data values for N different raking channels (where N is an integer greater than or equal to 2). (Step 810) In this embodiment, a raking channel (also called an arm or a finger) preferably refers to any kind of digital or analog data source.

The receiving device then buffers the received data values independently for each channel in a multiple entry buffer in each channel. (Step 820) Each data stream preferably arrives at its own clock speed, and the received data values are preferably stored in the multiple entry buffers using the clock associated with the received data value.

Then the receiving device reads data values out of the multiple entry buffer using the system clock, which is at a higher speed than the data clock. (Step 830)

As the receiving device reads data out, it continually checks to see if there is a danger of it over-sampling in any of the channels. Because the receiving device is writing in at a lower speed than it is reading out at, there will at some point be a danger of over-sampling.

If the receiving device determines that there is no danger of over-sampling in step 840, it returns to step 810 and receives a new set of data values for each channel.

If the receiving device determines that there is a danger of over-sampling in step 840, it halts reading from all of the channels at the same time for once cycle of the system clock. (Step 850) This will give each of the channels a chance to allow their data writing to once again get a little bit ahead of their data reading. There is no danger of over-sampling the writing operation, so the receiving device proceeds to write the next piece of data while the reading is halted.

The number of channels used is preferably between two to four, but alternate embodiments could use greater than four channels.

In some embodiments individual channels can be disabled for a time, in which case the receiving device can remove them from any decision-making processes with respect to the incoming signal. For example, a three-channel receiving device could have two channels operate, while one was disabled, operating for a time period as if it had only two channels.

The data clocks can vary in frequency. All the data clocks have the same initial frequency (though their phase can vary). But that base frequency for all the different data clocks could move over time and be different from cycle to cycle.

Obviously, numerous modifications and variations of the present invention are possible in light of the above teachings. It is therefore to be understood that within the scope of the appended claims, the invention may be practiced otherwise than as specifically described herein.

I claim:

1. A method for combining data from phase indeterminate data paths, comprising:

receiving a wireless signal at a receiving device, the wireless signal including a plurality of path components, each path component carrying a main phase indeterminate data stream derived from an original data stream;

splitting the received wireless signal into N signal copies and providing those N signal copies to N raking channels;

correlating each of the N signal copies with N locally-generated signals, respectively, to generate N correlated signals, each of the N correlated signals carrying a phase indeterminate path data stream that estimates one of the main phase indeterminate data streams from one of the plurality of path components;

synchronizing each of the N correlated signals to a system clock phase and a system clock frequency in the receiving device to generate N synchronized signals, each of the N synchronized signals carrying a synchronized path data stream;

aligning the N synchronized signals to generate N aligned signals, each of the N aligned signals carrying an aligned path data stream that is normalized in time with respect to the other (N−1) aligned signals; and combining the N aligned signals to produce an estimated original data stream.

2. A method for combining data from phase indeterminate data paths, as recited in claim 1, wherein the wireless signal is a UWB signal.

3. A method for combining data from phase indeterminate data paths, as recited in claim 1, wherein each of the N locally-generated signals has a different phase with respect to the other (N−1) locally-generated signals.

4. A method for combining data from phase indeterminate data paths, as recited in claim 1, wherein the step of synchronizing each of the N correlated signals in phase and frequency with a system clock comprises the following for each of the N correlated signals:

performing an $i^{th}$ write process at an $i^{th}$ data phase and an $i^{th}$ data frequency to write sequential data values from the phase indeterminate path data stream in the $i^{th}$ correlated signal into a buffer;

performing an $i^{th}$ read process at the system clock phase and the system clock frequency to read sequential data values out of the buffer to form the $i^{th}$ synchronized signal;

determining for each cycle of the $i^{th}$ read process whether the $i^{th}$ read process is about to collide with the $i^{th}$ write process; and pausing the $i^{th}$ read process by one cycle if the determining step determines that the $i^{th}$ read step is about to collide with the $i^{th}$ write process, wherein i is an integer that varies from 1 to N, and wherein the read frequency is greater than the write frequency.

5. A method for combining data from phase indeterminate data paths, as recited in claim 4, further comprising pausing all of the first through $N^{th}$ read processes if any one of the first through $N^{th}$ read processes are paused for a cycle.

6. A method for combining data from phase indeterminate data paths, as recited in claim 1, wherein the step of aligning the N synchronized signals comprises the following for each of the N correlated signals:

extracting an $i^{th}$ synchronized data stream from an $i^{th}$ synchronized signal;

extracting a control data stream from a control signal chosen from one of the N synchronized signals;

sequentially shifting the $i^{th}$ synchronized data stream with respect to the control data stream by J to K cycles in order;

determining (K−J+1) correlation values based on correlations between the control data stream and the shifted $i^{th}$ synchronized data streams for the J through K shift values;

determining which one of the J through K shift values provides the greatest correlation value; and shifting the second signal by the one of the J through K shift values that provides the greatest correlation value shift to provide the $i^{th}$ aligned data stream, where J and K are integers.

7. A method for combining data from phase indeterminate data paths, as recited in claim 6, wherein J is −3 and K is 3.

* * * * *